United States Patent [19]

Thomsen et al.

[11] Patent Number: 5,278,956
[45] Date of Patent: Jan. 11, 1994

[54] VARIABLE SIZED FIFO MEMORY AND PROGRAMMABLE TRIGGER LEVEL THEREFOR FOR USE IN A UART OR THE LIKE

[75] Inventors: Joseph A. Thomsen, Chandler; Marty L. Long, Mesa, both of Ariz.

[73] Assignee: VLSI Technology, Inc., San Jose, Calif.

[21] Appl. No.: 468,041

[22] Filed: Jan. 22, 1990

[51] Int. Cl.$^5$ .................................................. G06F 3/00
[52] U.S. Cl. ................................ 395/250; 364/238.7; 364/239.1; 364/239.2; 364/239.6; 364/242.1; 364/244.3; 364/244.5; 364/245.1; 364/247.4; 364/251.1; 364/251.3; 364/DIG. 1
[58] Field of Search .................... 364/DIG. 1; DIG. 2; 395/250

[56] References Cited

U.S. PATENT DOCUMENTS

| | | | |
|---|---|---|---|
| 4,062,059 | 12/1977 | Suzuki et al. | 395/250 |
| 4,071,887 | 1/1978 | Daly et al. | 395/200 |
| 4,225,919 | 9/1980 | Kyu et al. | 395/325 |
| 4,368,512 | 1/1983 | Kyu et al. | 395/325 |
| 4,374,428 | 2/1983 | Barnes | 395/250 |
| 4,455,608 | 6/1984 | Suzuki et al. | 395/250 |
| 4,750,149 | 6/1988 | Miller | 395/250 |
| 4,823,312 | 4/1989 | Michael et al. | 395/250 |
| 4,942,553 | 7/1990 | Dalrymple et al. | 395/250 |
| 4,949,333 | 8/1990 | Gulick et al. | 370/32 |
| 4,969,164 | 11/1990 | Mehta et al. | 377/41 |
| 4,975,828 | 12/1990 | Wishneusky et al. | 395/325 |
| 5,027,326 | 6/1991 | Jones | 365/221 |
| 5,048,012 | 9/1991 | Gulick et al. | 370/77 |
| 5,072,420 | 12/1991 | Conley et al. | 395/425 |
| 5,084,841 | 1/1992 | Williams et al. | 365/189.07 |
| 5,097,442 | 3/1992 | Ward et al. | 365/78 |
| 5,140,679 | 8/1992 | Michael | 395/325 |
| 5,199,105 | 3/1993 | Michael | 395/275 |

*Primary Examiner*—Thomas C. Lee
*Assistant Examiner*—Matthew C. Fagan
*Attorney, Agent, or Firm*—Burns, Doane, Swecker & Mathis

[57] ABSTRACT

Apparatus for providing data available interrupts that have a variable threshold for reading data from a receiver FIFO, and for selecting the depth of a variable depth FIFO for use as either the receiver or transmitter FIFO of a UART. The interrupt circuit determines if the FIFO data level is at or exceeds a preselected threshold value, and if it doesn't, triggers the reduction of the threshold level after a preselected period of time if there has been no access of the FIFO. If the data available level is still less than the reduced threshold value, the threshold value is again reduced by a preselected value following each elapse of a second preselected pause between each resetting of the threshold level until either a data available interrupt occurs, the threshold level is dropped to zero, or the FIFO is accessed. Whenever the receiver FIFO is accessed, the threshold level is reset to the original preselected level. The variable depth FIFO has a plurality of storage locations, and the depth of the storage locations is selected from fewer storage locations than the maximum number to the maximum number of the storage locations.

3 Claims, 6 Drawing Sheets

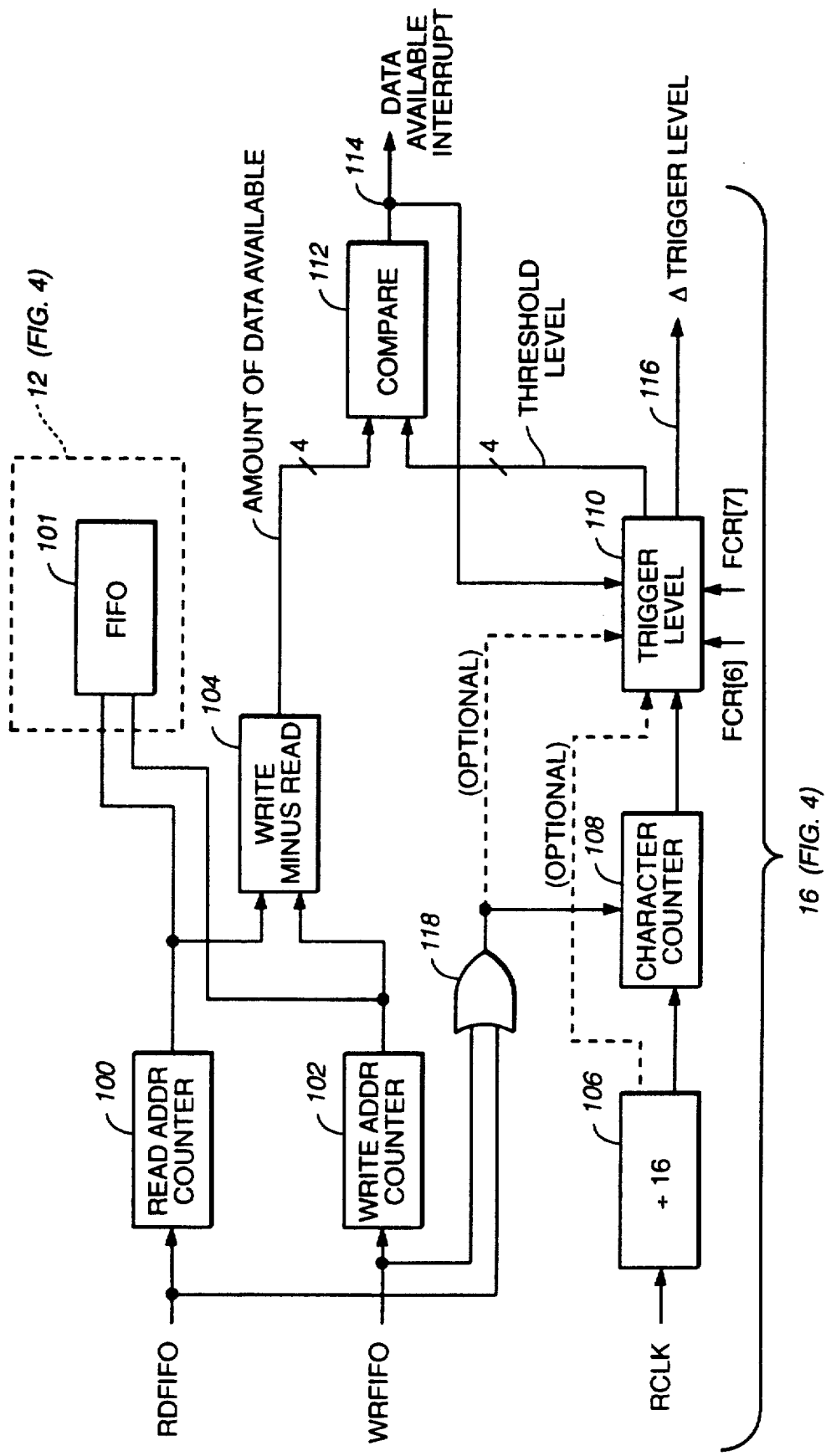
FIG._1

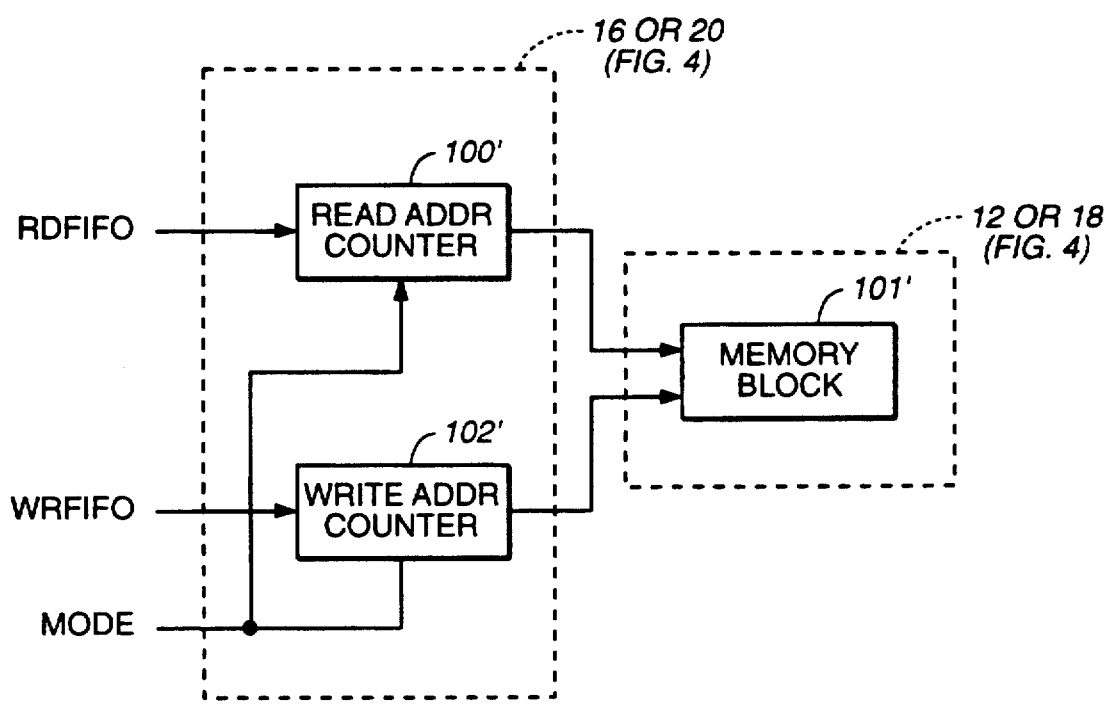
FIG._2

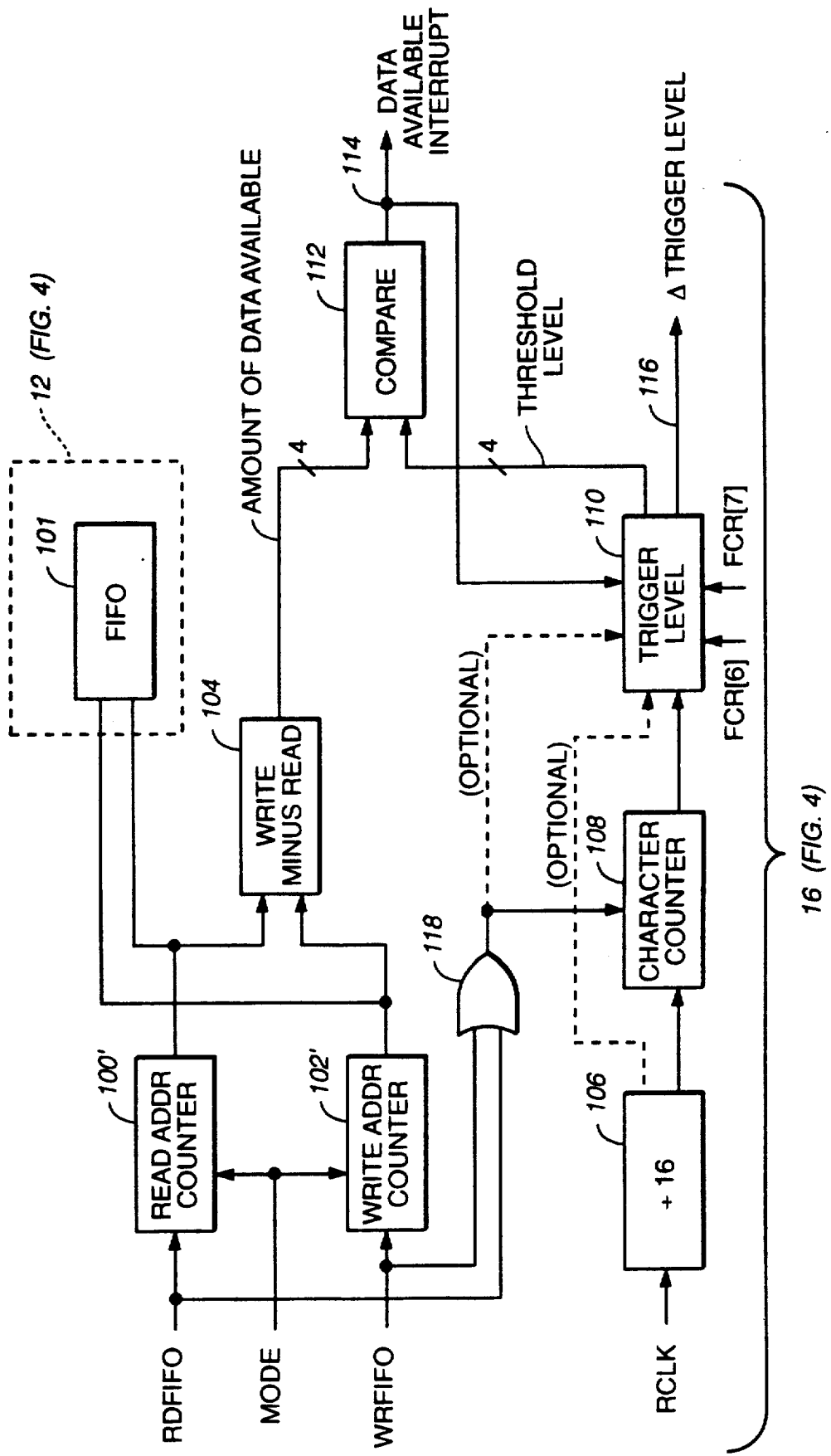
FIG._3

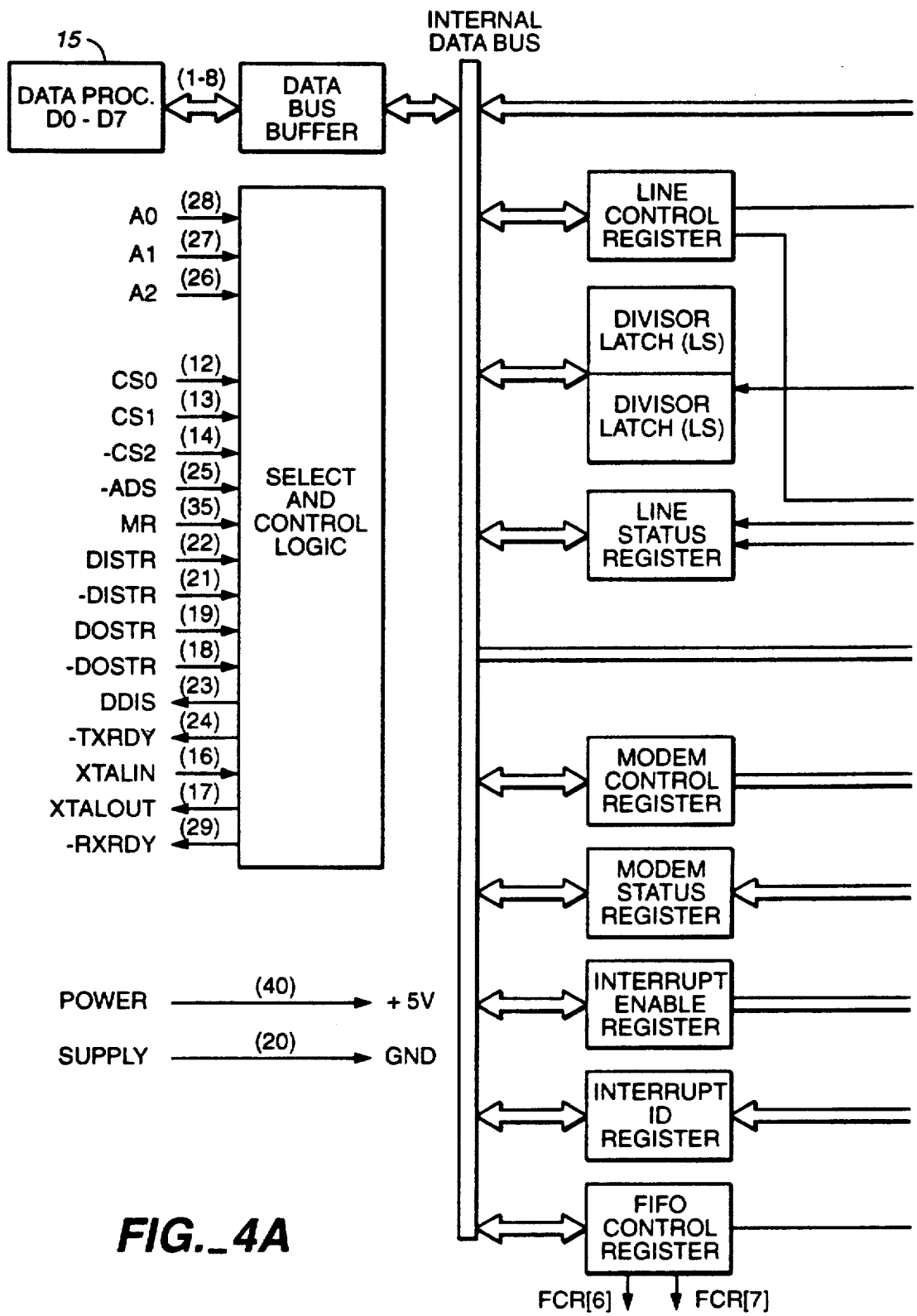
*FIG._4A*

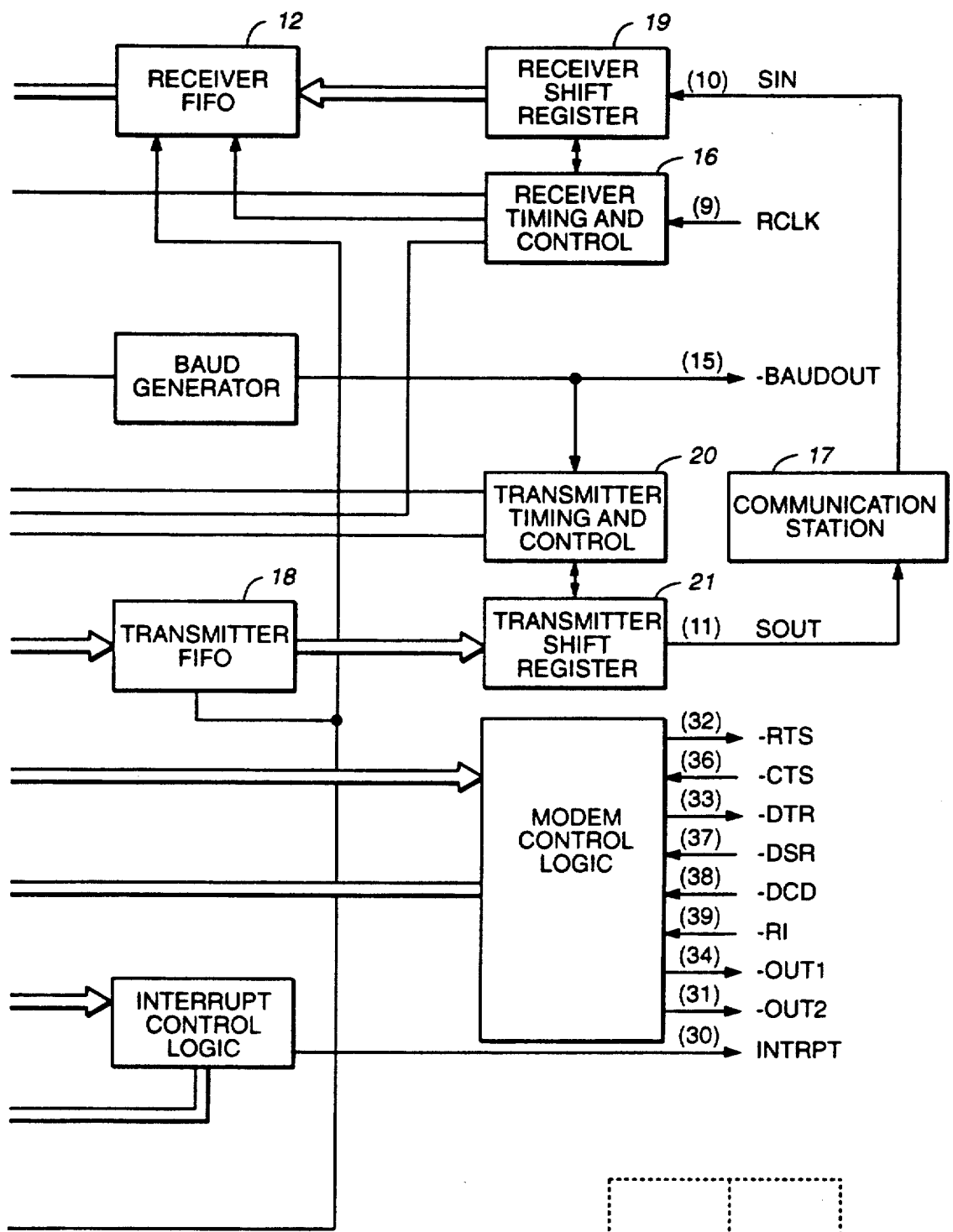
FIG._4B
FIG._4

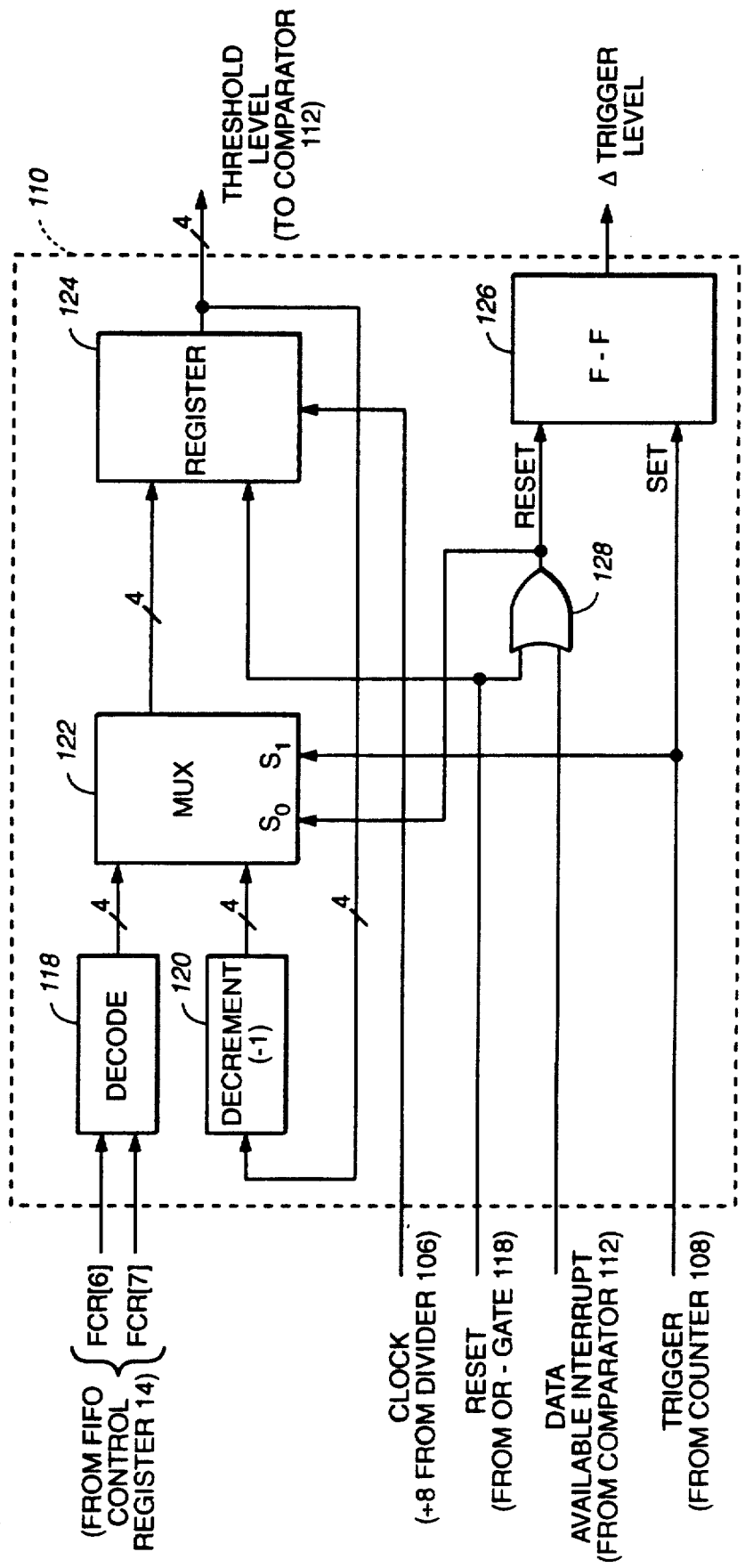
FIG._5

VARIABLE SIZED FIFO MEMORY AND PROGRAMMABLE TRIGGER LEVEL THEREFOR FOR USE IN A UART OR THE LIKE

BACKGROUND OF THE INVENTION

1. Field of the Invention

The present invention relates to data communications circuits and, in particular, to an asynchronous receiver/transmitter (UART), which is operable in alternate modes for use with a variety of CPU's and peripherals, and other applications where first-in, first-out memories are used.

2. State of the Art

Commercially available UARTs include a receiver FIFO memory and a transmitter FIFO memory with each of these FIFO memories, in actuality, comprising two or more FIFO memories each of a selected fixed length and depth to maximize the compatibility of the UART with other devices in different environments.

Similarly, multi-decisional interrupt circuits are included with a FIFO memory to insure the timely reading of the data stored in the FIFO. Each of the decision steps are implemented with a separate interrupt circuit.

U.S. Pat. No. 4,823,312 issued to Michael, et al. discloses a UART that has both of those functions, and more specifically each of the receiver FIFO memory and the transmitter FIFO memory includes a FIFO memory that performs the function of a buffer to store multiple bits of data. The number of bytes stored is selected as a trigger level at which a first of the decisional circuits generates an interrupt to the CPU to indicate that there is data available in the FIFO. With a large block of data, reading and writing continues until eventually the end of the block of data is reached. This results in there being data in the FIFO that is possibly below the selected trigger level. If that happens, there is no way for the CPU to know that there is still data in the FIFO without a second decisional interrupt circuit. Without the second decisional interrupt circuit that data would be lost.

The second decisional interrupt circuit that is incorporated into the prior art is a timing circuit that monitors the length of time since the FIFO has been accessed to either read from it or to write to it. If that time exceeds a selected period, a time-out interrupt is generated to the CPU to read the remaining data in the FIFO.

It would be desirable to have a UART that incorporates a variable length and depth FIFO to provide the maximum variability of the FIFO size to better match it to various applications without increasing the chip size for the overall device. Additionally, it would be desirable to minimize the size of the, and to have one, multi-decisional interrupt circuit to maintain control of the growth of the size of the semiconductor chip that the overall device requires. The improvements of the present invention provide both goals.

SUMMARY OF THE INVENTION

In accordance with the illustrated embodiments, the present invention provides a data available interrupt circuit with a variable threshold for reading data from a receiver FIFO, and a variable depth FIFO where the depth of the FIFO is selectable for use as either the receiver or transmitter FIFO of a UART.

The data available interrupt circuit includes means for first determining if the data level in the receiver FIFO is at or exceeds a preselected threshold value. The interrupt circuit also includes timing means to determine if the threshold has not been exceeded as the end of the data frame approaches and there has been no access of the receiver FIFO for a preselected period of time, then there is means to reduce the threshold by a preselected amount. If the data available level is still less than the reduced threshold value, the threshold value is again reduced by a preselected value following each elapse of a second preselected pause between each resetting of the threshold level until either a data available interrupt occurs, the threshold level is dropped to zero, or the receiver FIFO is accessed. Whenever the receiver FIFO is accessed, the threshold level is reset to the original preselected level. If the data available interrupt is generated with the threshold level set at any level other than the original preselected level, the present invention also generates a δ trigger level flag.

The variable depth FIFO of the present invention includes memory means having a plurality of storage locations for storing data characters, and selection means for selecting the depth of the storage locations from fewer storage locations than the maximum number to the maximum number of the storage locations.

BRIEF DESCRIPTION OF THE DRAWINGS

FIG. 1 is a schematic block diagram of the variable, programmable FIFO interrupt threshold and trigger level circuit of the present invention for use with the receiver FIFO in a UART.

FIG. 2 is a schematic block diagram of the variable sized FIFO memory of the present invention for use as either the receiver or transmitter FIFOs in a UART.

FIG. 3 is a schematic block diagram of the combination of the variable, programmable FIFO interrupt threshold and trigger level circuit, and the variable sized FIFO memory each of the present invention for use in the receiver FIFO in a UART.

FIG. 4 which includes FIGS. 4A and 4B together is a schematic block diagram of a UART that incorporates the FIFO memory and interrupt features of the present invention.

FIG. 5 is a schematic block diagram of the trigger level circuit 110 of FIGS. 1 and 3.

DESCRIPTION OF THE PREFERRED EMBODIMENTS

One of the features of the present invention is to provide a data available interrupt. This signal is generated by first determining if the data level in the receiver FIFO is at or exceeds a preselected threshold value. If the threshold has not been exceeded as the end of the data frame approaches and there has been no access of the receiver FIFO for a preselected period of time, then the threshold is dropped by a preselected amount each time with a second preselected pause between each resetting of the threshold level until either a data available interrupt occurs, the threshold level is dropped to zero, or the receiver FIFO is accessed. Whenever the receiver FIFO is accessed, the threshold level is automatically reset to the original preselected level. If the data available interrupt is generated with the threshold level set at any level other than the original preselected level, the present invention also generates a δ trigger level flag.

FIG. 1 is a block diagram schematic of a circuit that operates in this way with a RAM functioning as FIFO 101. The FIG. 1 circuit includes means for enabling a receiver memory (e.g., receiver FIFO 12) such that data characters transferred from a communication station 17 via a receiver shift register (e.g., receiver shift register 19 of FIG. 4), are transferred to a data processing system 15 via the receiver memory. Further, means are provided for enabling a transmitter memory (e.g., transmitter FIFO 18) such that data characters are transferred from the data processing system 15 to a transmitter shift register (e.g., transmitter shift register 21 of FIG. 4) via the transmitter memory. In the upper left corner of FIG. 1 there are two counters, a read address counter 100 and a write address counter 102 each of which counts the number of times it receives a RDFIFO and a WRFIFO signal, respectively. Thus, when you do a write, you increment write address counter 102 by one, and when you do a read you increment read address counter 100 by one. Signals that are representative of the read and write counts are each applied to a subtractor 104 which produces a signal that is representative of the value of write minus read, which is the data level in FIFO 101. Each time you do a write you add a byte of data and every time you do a read you subtract a byte of data to and from FIFO 101.

The signal that represents the amount of data in FIFO 101 is then applied to one input terminal of a comparator 112 where it is compared to the threshold level signal from trigger level circuit 110. If the level of data stored in FIFO 101 (write minus read) is equal to or greater than the threshold level from trigger level circuit 110, comparator 112 outputs a data available interrupt signal on line 114.

The lower path in FIG. 1 performs the timing and threshold reduction function of the FIFO interrupt trigger circuit. Beginning with the RCLK signal which produces a clock signal at the bit rate, or higher of the UART, divider 106 divides that clock signal by a selected value to provide a suitable level of resolution. If the RCLK signal is eight times the bit rate, the divider 106 must divide by 16 so that the output signal from divider 106 has a resolution of one half a bit rate. The divided down signal from divider 106 is then applied to character counter 108. Character counter 108 counts the number of character times (number of pulses from divider 106) since it was last reset by a signal from OR gate 118 which has as its input signals RDFIFO and WRFIFO. (A character time is the period for receiving a full character which includes a stop bit, a plurality of data bits, parity if present, and a stop bit.) When either of the input signals of OR gate 118 occurs, character counter 108 is reset. The output signal of character counter 108 represents the number of characters times that have elapsed since FIFO 101 was last addressed, i.e. either a RDFIFO or a WRFIFO signal has occurred. The character count from counter 108 is then applied to trigger level circuit 110.

Trigger level circuit 110 is a threshold circuit with a preselected threshold as to the initial number of bytes in FIFO 101 at which the data available interrupt is to be generated. The preselected threshold value can either be preset or it can be user programmable. (FCR[6] and FCR[7] from FIFO control register 14 in FIG. 4. provide the preselected threshold value.) If the character count from counter 108 reaches a first selected level, then the preselected threshold level in level circuit 110 is reduced by a selected amount and that value then is applied to comparator 112. As the character count in counter 108 increases further, the threshold level of level circuit 110 is continually reduced until the threshold level equals the amount of data in FIFO 101, is reduced to zero, or character counter 108 is reset. In one implementation the threshold value automatically varies as the character count varies, so when counter 108 is reset, the threshold count is also indirectly reset to the original preset or programmed value.

Also, when the threshold level is reduced from the preselected level, trigger level circuit 110 sets a δ trigger level flag which appears on line 116. The data level that was present in FIFO 101 at the time the data available interrupt occurs can be determined with the use of the δ trigger level flag and an additional counter. First, if the data available interrupt occurs with the δ trigger level flag not having been set, the data level in FIFO 101 was at least at the preselected threshold level of level circuit 110. Second, since the algorithm that is used to reduce the threshold level is known, thus by timing how long after the occurrence of the δ trigger level flag is set that the data available interrupt occurs, the level of the data that was available in the FIFO can be determined.

In an alternate implementation, a divided down clock signal from divider 106 will also be applied to level circuit 110 as a second input signal, and the output signal of OR gate 118 will be applied to level circuit 110 as a reset signal to reset the threshold level to the original preselected value when FIFO 101 is again addressed. In this implementation the count from counter 108 is monitored by level circuit 110 until it exceeds a preselected value and then the threshold level of circuit 110 is reduced by a selected value. Once the threshold level has been reduced below the preselected level as described above, the threshold level is further reduced by a selected value upon the occurrence of a character time pulse from divider 106 (e.g.; from the divide by 8 tap of the divide by 16 divider 106).

In a typical application, the preset threshold level is of the order of 14 and it will not be reduced until the count of counter 108 reaches 3.5 and then the threshold will be reduced by 1. Then for each additional character time, the threshold level will be reduced by an additional 1.

By allowing some time to elapse before the threshold level is dropped, additional time is provided for FIFO 101 to acquire data. As the end of the data frame approaches the threshold level is reduced so that any data that was acquired will be read from FIFO 101 and not be lost.

Referring next to FIG. 5 there is shown a schematic block diagram of trigger level circuit 110 using both of the optional signal paths shown in FIGS. 1 and 3. The initial trigger threshold level is either preselected or user selected and stored in FIFO control register 14 (see FIG. 4). Signals FCR[6] and FCR[7] from the FIFO control register 14 are applied to a decode circuit 118 which modifies the signal pattern of FCR[6] and FCR[7] to four single bit binary signals which are applied in parallel to multiplexer 122. Four bits are necessary since the selected initial threshold level is typically selected to be 14 or less.

Upon the first occurrence of the clock signal, the preselected threshold level is clocked from the multiplexer 122, into the individual flip-flops of register 124 and then transferred to comparator 112. Until character counter 108 reaches the value at which the threshold level is to be reduced, the preselected value remains in multiplexer 112 and register 124. When the character count reaches the selected level (3.5 character times as discussed above), the trigger signal from counter 108 occurs. Since that trigger signal is connected to the S1 select terminal of multiplexer 122, the multiplexer is switched to obtain the threshold value to be transferred t register 124 from decrement circuit 120. The threshold value from decrement 120 is derived from the last value held by register 124 less one. Once the input source switch is made for multiplexer 122, the threshold value is obtained from decrement 120 until the circuit is reset as discussed below. The occurrence of the trigger from counter 108 is also used to set flip-flop 126 to provide the δ trigger level signal discussed above.

When a reset signal is received from OR-gate 118 (FIGS. 1 and 3), or a data available interrupt signal is generated by comparator 112 (FIGS. 1 and 3), flip-flop 126 is reset to zero to remove the δ trigger level signal and multiplexer 122 is switched back to obtain the threshold level from decoder 118 as a result of the output signal of OR-gate 128 being applied to the reset terminal of flip-flop 126 and the S₀ terminal of multiplexer 122, respectively.

Referring next to FIG. 2 there is shown a block schematic diagram of FIFO memory that has a variable depth. This has application where it is desirable to produce a single UART that can interface with a maximum of other circuits. For example, in some applications the UART needs only a buffer (single bit deep FIFO) in the receiver and transmitter FIFO locations, whereas in other applications a full scale FIFO is needed.

FIG. 2 shows three elements, read address counter 100', write address counter 102', and memory block 101'. These elements have each been given reference numbers that are similar to the reference numbers used in FIG. 1 for similarly labelled blocks in FIG. 2 since this portion of the present invention can be combined with the interrupt circuit of FIG. 1 for the receiver FIFO as shown in FIG. 3.

Address counters 100' and 102' function as described above in relation to FIG. 1 and have the added feature of being able to adjust the depth of the RAM FIFO 101' in response to the signal applied to the MODE signal line. In each implementation of this portion of the present invention memory block 101' is a RAM with the maximum depth that is desired for the programmable depth FIFO. To vary the depth of the FIFO, both of address counters 100' and 102' are controlled so that they count to a value that corresponds to the depth of the FIFO that is desired. If a FIFO with a fixed depth, say 16, is required in some applications, and a FIFO with a unit depth, i.e. a buffer, in another application, each of the address counters can be a ripple counter wherein the maximum count corresponds to the fixed depth of the FIFO. In this situation when the signal on the MODE line is low, address counters 100' and 102' are free to count through their full range, and when the FIFO is to be a buffer the MODE signal is high and is applied to the reset terminals of each of address counters 100' and 102'. By holding the reset line of these counters high, the counter is unable to count higher than one and only the first row of memory 101' can be addressed. In an alternate embodiment where at least one intermediate depth is required for the FIFO, the output tap of the ring counters of address counters 100' and 102' can be selected by a multi-bit MODE signal that controls a multiplexer within each of address counters 100' and 102'. Thus, as in the situation where the FIFO is used as a buffer, when the maximum address of counter 100' and 102' is limited to a value that is less that its possible maximum value, only that number of rows of the RAM are used.

FIG. 4 shows a block schematic diagram of a typical UART the operation of which is known to one skilled in the art. The typical UART of FIG. 4 constitutes a data communications device which can perform parallel-to-serial conversion on digital data transmitted by a data processing system generally labeled data processor 15 for serial transfer to a communication station generally labelled 17, such as a peripheral device or modem, which is external to the data processing system, and serial-to-parallel conversion on digital data received from the communication station 17 for parallel transfer to the data processing system 15. For example, the data communications device of FIG. 4 includes a receiver shift register 19 that receives serial data transfers from the communication station and a transmitter shift register 21 which provides serial transfer of data characters to the communication station. A description of the functions of the various blocks in the UART can be found in U.S. Pat. No. 4,823,312. Where the operation of this circuit is different from past UARTs is discussed above in relation to FIG. 1-3. The blocks of the receiver FIFO interrupt feature of FIG. 1, and the combined interrupt and variable depth FIFO features of FIG. 3, are split between three blocks in FIG. 4; FIFO 101, or memory block 200, is part of the features of receiver FIFO 12, the selected threshold level is stored in FIFO control register 14, and the remainder of the circuit in FIGS. 1 and 3 is part of the features of receiver timing and control 16.

The variable depth FIFO design shown in FIG. 2 can be used as part of either the receiver FIFO or the transmitter FIFO assemblies of FIG. 4. In the receiver FIFO application memory block 101' is included in receiver FIFO block 12, and the two address counters 100' and 102' are both included in receiver timing and control block 16. Similarly, in the transmitter FIFO application memory block 101' is included in transmitter FIFO block 18, and the two address counters 100' and 102' are both included in transmitter timing and control block 20.

From the foregoing description, it will be apparent that the invention disclosed herein provides novel and advantageous improvements in UART design. As will be understood by those skilled in the art, the present invention may be embodied in other specific forms without departing from the spirit or essential characteristics thereof.

What is claimed is:

1. A data communications device that performs conversion on digital data transmitted between a communications station and a data processing system, the data communications device comprising:
   a receiver shift register that receives serial data from the communication station and that outputs parallel data;
   receiver memory means for receiving said parallel data from the receiver shift register; and means for issuing an interrupt to the data processing system, said issuing means further including:
   comparator means for comparing an amount of data stored in the receiver memory means with a data threshold level having a preset initial value; and
   means for triggering reduction of said threshold level by a first selected value if said comparator means determines that the amount of stored data does not equal or exceed the preset initial value of the threshold level within a first preselected length of time following a time when the receiver memory means was last addressed to be written to or to be read from; said triggering means following reduction of the threshold value and if the receiver memory means still has not been addressed, reducing the threshold value by a second selected value following elapse of each time period of a second preselected length of time until an interrupt is generated or the threshold level is reduced to zero, said triggering means resetting said threshold level to the preset initial value whenever the receiver memory means is addressed to be read from or to be written into.

2. A data communications device that performs conversion on digital data transmitted between a communication station and a data processing system, the data communications device comprising:
 a receiver shift register that receives serial data from the communication station and that outputs parallel data;
 receiver memory means for receiving said parallel data from the receiver shift register; and
 means for issuing an interrupt to the data processing system, said issuing means further including:
  comparator means for comparing an amount of data stored in the receiver memory means with a data threshold level;
  means for setting said data threshold level to a selected initial value; and
  means for triggering reduction of said threshold level by a first selected value if said comparator means determines that the amount of stored data does not equal or exceed the selected initial value of the threshold value within a first preselected length of time following a time that the receiver memory means was last addressed to be written to or to be read from; said triggering means following reduction of the threshold level and if the receiver memory means still has not been addressed, reducing the threshold level by a second selected value following elapse of each time period of a second preselected length of time until an interrupt is generated or the threshold level is reduced to zero, said triggering means resetting said threshold level to the selected initial value whenever the receiver memory means is addressed to be read from or to be written into.

3. A data communications device that performs parallel-to-serial conversion on digital data transmitted by a data processing system to a communication station which is external to the data processing system and that performs serial-to-parallel conversion on digital data received from the communication station, the data communications device comprising:
 a receiver shift register that receives serial data from the communication station;
 variable depth receiver memory means comprising a plurality of storage locations for storing parallel data received from the receiver shift register;
 selection means for selecting a depth of the storage locations in the variable depth receiver memory means, said depth corresponding to a first number of storage locations which is less than or equal to a second number of available storage locations;
 means for issuing an interrupt to the data processing system, said issuing means further including:
  comparator means for comparing an amount of data stored in the variable length receiver memory means with a data threshold level having a preset initial value; and
  means for triggering reduction of said threshold level by a first selected value if said comparator means determines that the amount of stored data does not equal or exceed the preset initial value of the threshold level within a first preselected length of time following a time that the variable depth receiver memory means was last addressed to be written to or to be read from; said triggering means following reduction of the threshold value and if the variable depth receiver memory means still has not been addressed, the threshold level by a second selected value following elapse of each time period of a second preselected length of time until an interrupt is generated or the threshold level is reduced to zero, said triggering means resetting said threshold level to the preset initial value whenever the variable receiver memory means is addressed to be read from or to be written into;
 transmitter memory means for receiving parallel data from the data processing system;
 a transmitter shift register that receives the parallel data from the transmitter memory means for serial transfer to the communication station; and
 means for enabling the variable depth receiver memory means such that the parallel data received from the receiver shift register is transferred to the data processing system via the variable depth receiver memory means.

* * * * *